Sept. 4, 1973     F. M. GALLOWAY ET AL     3,756,890
MANUFACTURE OF MULTI-LAYER ARTICLES BY IN SITU
POLYMERIZATION OF ADHESIVE COMPONENTS
Filed Aug. 12, 1969
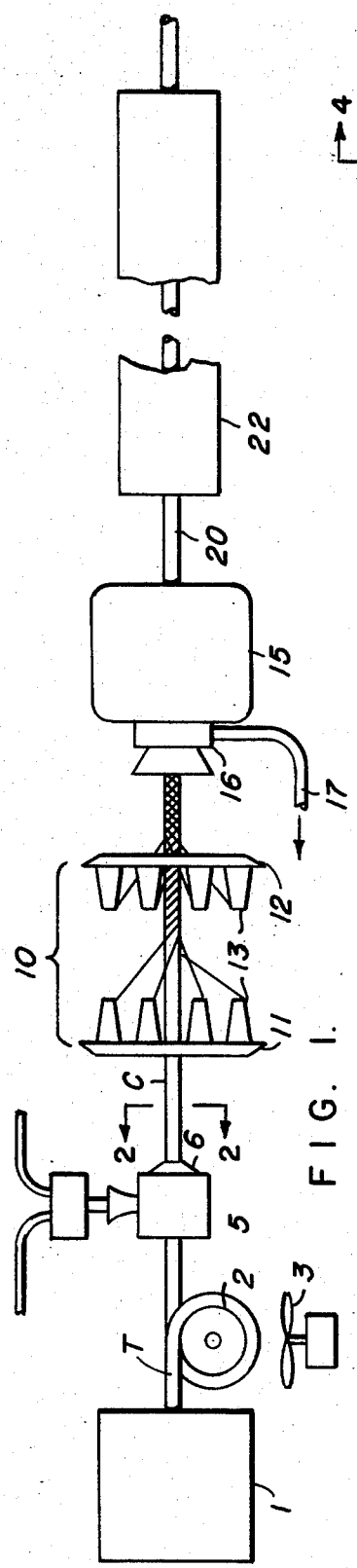
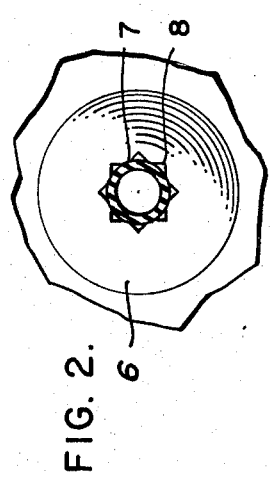
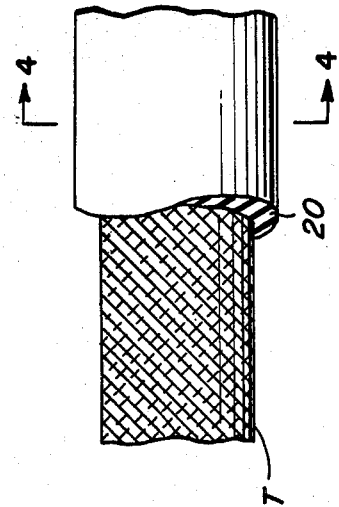
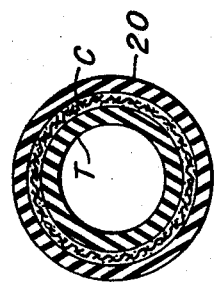
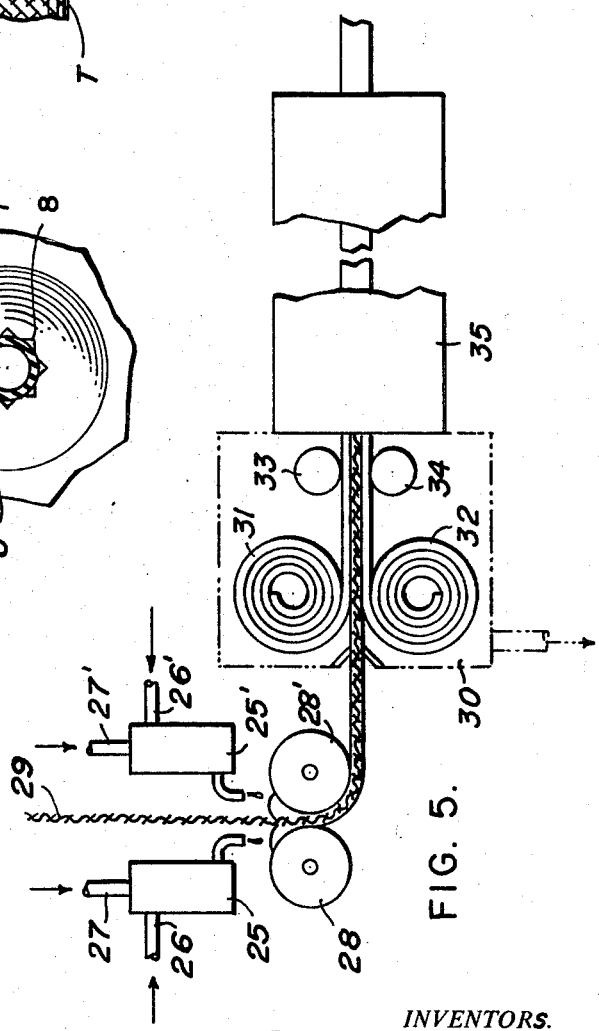
*INVENTORS.*
FREDERICK M. GALLOWAY
EARLE F. WEBSTER
BY
ATTORNEY.

United States Patent Office 3,756,890
Patented Sept. 4, 1973

3,756,890
MANUFACTURE OF MULTI-LAYER ARTICLES BY IN SITU POLYMERIZATION OF ADHESIVE COMPONENTS
Frederick M. Galloway, Coraopolis, Pa., and Earle F. Webster, Riverton, N.J., asssignors to H. K. Porter Company, Inc., Pittsburgh, Pa.
Filed Aug. 12, 1969, Ser. No. 849,357
Int. Cl. B29c 17/00
U.S. Cl. 156—286      1 Claim

ABSTRACT OF THE DISCLOSURE

Manufacture of multilayer objects or articles by an improved technique for securing a permanent bond between layers of different materials, such as polyester fiber or fabric reinforcement and elastomeric layers in hose, belting and the like and in other situations where a complete and uninterrupted bond throughout an area of substantial extent is required, by saturating the intermediate reinforcing layer with the mixed ingredients of a polymeric adhesive as the outer layers are brought into contact therewith and producing the adhesive in situ by thereafter effecting polymerization of said ingredients.

CROSS REFERENCE TO RELATED APPLICATIONS

In a copending application for U.S. Letters Patent for Continuous Manufacture of Reinforced Hose, Ser. No. 686,037 filed Nov. 28, 1967 by Frederick M. Galloway, now U.S. Pat. 3,586,558, one of the present inventors, and others there is disclosed a practice for making hose wherein an inner elastomeric tube is continuously produced by an extruder of known character, passed longitudinally through a reinforcement applying machine in which polyester fiber yarns are laid in opposed spiral patterns on its surface and thence to a second extruder, comprising vacuum means designed to extract air from the reinforcing layer and means for depositing an outer covering layer of elastomeric material thereover. From the second extruder the hose then passes into continuous "fluidized bed" heating means wherein the elastomeric components are vulcanized or cured, and the layers thereof, questionably bonded to each other through interstices in the reinforcing layer. In practice, however, it has been found difficult to effect this internal bonding of the elastomeric layers to the reinforming layer and to each other with a sufficient approach to perfection to inhibit relative movement of the fiber components of the reinforcing layer with consequent undue wear, when the hose is flexed in service and especially when the hose is subjected to repeated pulsations of internal pressure in such service.

One improvement embodying apparatus in the nature of possibly more effective vulcanizing or curing means than the said fluidized bed is disclosed and claimed in copending application of Bruce M. Guelich and Charles Porter, Ser. No. 802,442 filed Feb. 26, 1969, now U.S. Pat. 3,627,610, wherein as in the apparatus of said prior application of Galloway et al., difficulties have been encountered in securing perfect bonding of the elastomeric layers to the reinforcing layer and to each other. It has been speculated that this may be due to entrapment of air in the reinforcing layer, notwithstanding the vacuum treatment to which it is subjected or possibly to some absorption of moisture by the said layer, which moisture, converted to steam during the curing of the elastomeric components, impairs intimate bonding of the principal components of the hose.

BACKGROUND OF THE INVENTION

The difficulties to which reference has been made were encountered in manufacturing operations on behalf of H. K. Porter, Inc. employer of the present applicants and the background of this invention consists largely of experience with the practices investigated in efforts to commercialize hose made pursuant to the disclosures of said prior copending applications.

SUMMARY OF THE INVENTION

The present invention is directed to a method of manufacture of laminated or multilayer articles which when utilized for making reinforced hose of the general character of that with which said prior applications are concerned includes the introduction of a polymerizable liquid mixture of monomers and other ingredients capable of combining to form an adhesive for saturating or coating a reinforcing layer as it is introduced between other layers of material and occupying voids in which air might otherwise be entrapped therebetween and comprising as well ingredients capable of reacting with any water molecules that may be present to prevent the formation of steam therefrom during the curing operation, in the course of which said monomers are polymerized in situ into an elastomeric adhesive composition compatible with and permanently bonded to the adjacent surfaces of the outer layers, as well as coating and bonding together the fibers of the reinforcing layer to minimize their relative movement and consequent internal wear.

BRIEF DESCRIPTION OF THE DRAWING

In the accompanying drawing:

FIG. 1 is a fragmentary diagrammatic view of apparatus suitable for continuous manufacture of reinforced elastomeric hose in accordance with the invention;

FIG. 2 is a greatly enlarged diagrammatic detail on line 2—2 in FIG. 1 showing a fitting devised to insure even distribution of the monomeric mixture applied to the inner tube just prior to its introduction to the reinforcement applying means;

FIG. 3 is fragmentary side elevation partly broken away to show internal construction of a typical hose manufactured with the aid of the apparatus of FIG. 1 and in accordance with the invention;

FIG. 4 is a transverse section on line 4—4 in FIG. 3 and

FIG. 5 is a fragmentary diagrammatic side elevation partly in vertical section of apparatus suitable for the practice of the invention in the manufacture of sheet material such as reinforced elastomeric belting, plywood or the like.

DESCRIPTION OF THE PREFERRED EMBODIMENT

Our invention is directed primarily to effecting an uninterrupted bond throughout substantial surface areas between an intermediate layer such as one comprising a fabric made of fibers of the general nature of the polyester terephthalates, of which there are several on the market, but it is not to be considered as limited by the shape or size of said surfaces or whether of two dimensions or three as will hereinafter more fully appear.

In the manufacture of polyester-terephthalate-reinforced hose, the invention is particularly appropriate for utilization in association with a substantially continuous procedure and the apparatus diagrammatically illustrated in FIG. 1 is designed accordingly.

Thus the said apparatus comprises a continuous tube extruder 1 from which when in operation and being fed appropriate quantities of a suitable elastomeric composition an inner tube T is continuously produced. The working of the elastomer in the extruder customarily generates substantial quantities of internal heat and it is therefore usually desirable to pass the extruded tube over, and generally several times around a rotatable cooling drum 2 which in turn may be cooled if desired by a fan 3 positioned to direct a stream of ambient air over and about the drum 2 for dissipation the heat conducted to it by its contact with the hot tube T. From the drum 2 if one is employed, or directly from the extruder 1 if no intermediate cooling means are used, the tube T passes through mixing apparatus generally designated 5, wherein liquid mixture of which further details will be hereinafter set forth is applied to its surface and spread thereover in a relatively thick and circumferentially and longitudinally uniform coating C by a "doctor" cone 6. As illustrated in detail in FIG. 2 this cone contains a substantially circular opening 7 with a plurality of circumferentially spaced small channels 8 paralleling its axis for facilitating the uniform distribution of the coating material. From the doctor cone the coated tube passes into and through a reinforcement applying mechanism generally designated 10 which in this instance comprises a pair of opposed coaxial rotatably heads 11, 12, each carrying a plurality of cops or cones 13 of preferably continuous filament polyester yarns. These heads, rotating in opposite directions as the coated tube T is passed axially through them operate to apply successively to the tube a plurality of spirally wound yarns under sufficient tension to embed them in the coating and preferably to extrude some of its into and through interstices between adjacent yarns whereby voids in the reinforcing layer on the tube are occupied by the relatively fluid material.

The reinforced and coated tube then passes into a second extruder 15 through an air trap 16 of standard design whereby the interior of the extruder may be subjected to reduced pressure through a connection 17 with an appropriate vacuum pump (not shown) for removing air entrapped in the coating or in the reinforcement and an outer layer 20 of elastomeric material is then extruded over them.

From the second extruder 15 the now completed but uncured hose passes to continuous vulcanizer 22, any appropriate kind or character being suitable, or if "batch" vulcanizing is preferred the uncured hose may be accumulated in suitable receptacles for curing in accordance with that practice, the procedure employed for curing the components of the hose and insuring polymerization of the adhesive components constituting no part of the invention.

In a modification of the foregoing practice which is useful primarily for manufacture of "two dimensional" articles such as laminated sheet material a pair of continuous mixers 25, 25' adapted to receive through pipes 26, 26', 27, 27' the ingredients of adhesive are disposed adjacent the nip of a pair of rolls 28, 28' between which a web or sheet 29 of material to become inner layer of the article is continuously fed. The rolls, are rotated by any suitable means (not shown) to pass the sheet 29 between them while the fluid mixture of adhesive ingredients discharged from the mixers 25, 25' into the nip of the rolls coats and impregnates the web, which then passes from the rolls into a vacuum chamber 30 in which outer layers 31, 32, of other sheet material are applied to its opposite faces and pressed by pinch rolls 33, 34 into intimate engagement therewith. The composite material then passes out of the vacuum chamber and into a curing oven 35 in which vulcanization of the outer layers, if required, and polymerization of the adhesive ingredients is effected to insure permanent adherence together of the several layers of the composite article. The outer layers 31, 32 may be of elastomeric material in the manufacture, for example, of conveyor belting or the like but the invention is useful as well for bonding together layers of wood veneer as in the manufacture of plywood, or any other appropriate materials may be utilized provided only that in accordance with the invention the liquid mixture employed for saturating the intermediate layer 29 be composed of ingredients capable of combining to produce by in situ polymerization an adhesive substance permanently bonding the intermediate layer with the outer layers and thus binding all three together in a single composite structure.

The mechanisms herein above described for applying the liquid mixture to the article or component being made are, of course represented only diagrammatically in the drawing as they constitute no part of the invention and their specific structure and operation is but a matter of choice. Hence by our disclosure of such mechanisms we do not exclude from use in the practice of the invention means for applying the mixture by dip roll coating, spread coating or in any other way suitable for attaining the desired results.

It will be appreciated moreover that when natural materials, such as wood veneer, are being laminated in accordance with the invention it is substantially essential they be subjected to a preliminary drying step to remove as much as possible entrained or adherent moisture which as has been noted, can interfere with perfect adhesion, if present.

Reference has herein been made to utilization of monomeric ingredients of an adhesive created by in situ polymerization of the said ingredients after the mixture of them has been applied to the adherends and it is contemplated by the invention that the specific nature of said ingredients may vary, especially when the character and composition of the adherends is changed. However, in the continuous manufacture of elastomeric hose reinforced by a layer or layers of fibers of fabric of a polyester terephthalate we prefer to employ the product sold under the trade designation R 45 M by Sinclair Chemicals Corporation understood to be a polybutadiene homopolymer, with which is combined at the rate of about 1.5:1 parts by weight finely divided zinc oxide (ZnO) the particles of which in dispersed condition should average about 5 microns ($5 \times 10^{-6}$ M) in longest dimension, with none exceeding 60 microns ($60 \times 60^{-6}$ M). For best results this ingredient, consisting of R 45 M in which ZnO particles are dispersed by thorough mechanical mixing before being combined with other components should be subjected to de-watering and de-gassing treatments to eliminate therefrom any entrained water or gas and it is preferably stored in containers under pressure of gaseous dry nitrogen from which it may be discharged directly into the pipe leading to the adhesive ingredients mixer. In some instances it may be advisable to premix into the dispersion or to inject into the stream during its passage to the mixer a small quantity of a catalyst such as 5% stannous octoate also preliminarily dewatered and degassed and likewise maintained under pressure of gaseous dry nitrogen.

The mixture of R 45 M and zinc oxide, with stannous octoate when it is employed, on entering the mixing chamber of the mixer is physically mixed therein with tolylene diisocyanate in the proportion of about 15–22 parts to 100 parts of R 45 M, somewhat in excess of the stoichiometric proportion, likewise discharged into the mixing chamber under gaseous dry nitrogen pressure.

As the adhesive ingredients are brought together an exothermic polymerization is spontaneously initiated and to control its rate it is usually desirable to cool the mixing chamber to prevent too rapid polymerization of the components. Hence, it is normally in effect a mixture of components having little of the character of an adhesive which is applied to the intermediate layer of the article immediately preceding its encasing within the other layers; being a relatively free flowing liquid it quickly penetrates interstices in the intermediate layer, saturating the latter and constituting with it, aided by the apparatus for smoothing its distribution, a relatively smooth surfaced layer with which the elastomeric layers become completely congruent whereby continuous contact between the liquid and the said layers is insured. The chemical reaction in progress during this period causes the mixture to acquire structural strength with increased tackiness which facilitates the securement of the outer elastomeric covering to the adhesive coated yarn reinforcement in the subsequent curing operation in the course of which the mixture completely polymerizes into a true adhesive and an uninterrupted bond is formed at both interfaces of the adhesive-coated intermediate layer with the other layers.

Utilization of stannous octoate in about the proportions mentioned tends to accelerate the polymerization of the R 45 M (or other suitable aliphatic composition containing an —OH group in at least one end of its chain) with the tolylene diisocyanate (or other suitable aromatic component containing an NCO group) which apparently proceeds substantially in accordance with the following general equation:

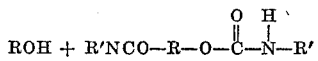

wherein R and R' may be any combination of aliphatic or aromatic radicals, the product having adhesive properties compatible with elastomeric compositions and many other substances adapted to be bonded together in accordance with the invention.

If desired however, other adhesives, provided they be capable of being produced by in situ polymerization reaction between their components deposited as a mixture on at least one of the adherends, may be utilized.

Thus in the manufacture of plywood, having a wood or fabric layer interposed between two outer layers of wood veneer the liquid components will usually be materials better suited to the production of an adhesive specifically adherent to wood surfaces, and corresponding other adjustments in the ingredients employed will normally be made to accommodate different adherends.

We claim:
1. The method of making a multilayer article which comprises coating at least one surface of one of the layers with a liquid mixture of ingredients including an aliphatic compound containing an NCO group in which a double bond extends between O and C and a single bond extends between C and N adapted on polymerization to become an adhesive substance, bringing the coated surface of said layer and the surface of another layer of the article together in a vacuum while rendering said coating congruent and coextensive with said surface of said other layer and then by application of heat effecting polymerization of said mixture and bonding said layers together in contact with said coating.

References Cited
UNITED STATES PATENTS

| | | | |
|---|---|---|---|
| 3,410,817 | 11/1968 | McClellan et al. | 156—331 X |
| 3,411,970 | 11/1968 | Perrin | 156—331 X |
| 3,411,981 | 11/1968 | Thomas | 156—331 X |
| 3,411,980 | 11/1968 | Leshin | 156—331 X |
| 3,438,922 | 4/1969 | Ueno et al. | 156—331 X |
| 3,450,676 | 6/1969 | Grogler et al. | 156—331 X |

STEPHEN J. LECHERT, JR., Primary Examiner

U.S. Cl. X.R.

156—244, 331